March 14, 1933.  L. E. LA BRIE  1,901,657
BRAKE
Filed Jan. 30, 1929  2 Sheets-Sheet 1

INVENTOR.
LUDGER E. LA BRIE
BY
ATTORNEY

March 14, 1933.   L. E. LA BRIE   1,901,657
BRAKE
Filed Jan. 30, 1929   2 Sheets-Sheet 2

INVENTOR
LUDGER E. LA BRIE
BY
ATTORNEY

Patented Mar. 14, 1933

1,901,657

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed January 30, 1929. Serial No. 336,129.

This invention relates to brakes, and is illustrated as embodied in an internal expanding automobile brake. Various features of novelty relates to a simplified brake control in which a tension operating element extending horizontally through the backing plate is connected inside the brake drum through a floating cam lever or the like, to a brake having a series of shoes in disconnected thrust engagement, one of them preferably acting on another through an adjustable member. Other structural features will be apparent from the following description of the illustrative embodiments shown in the accompanying drawings, in which:

Figure 1:
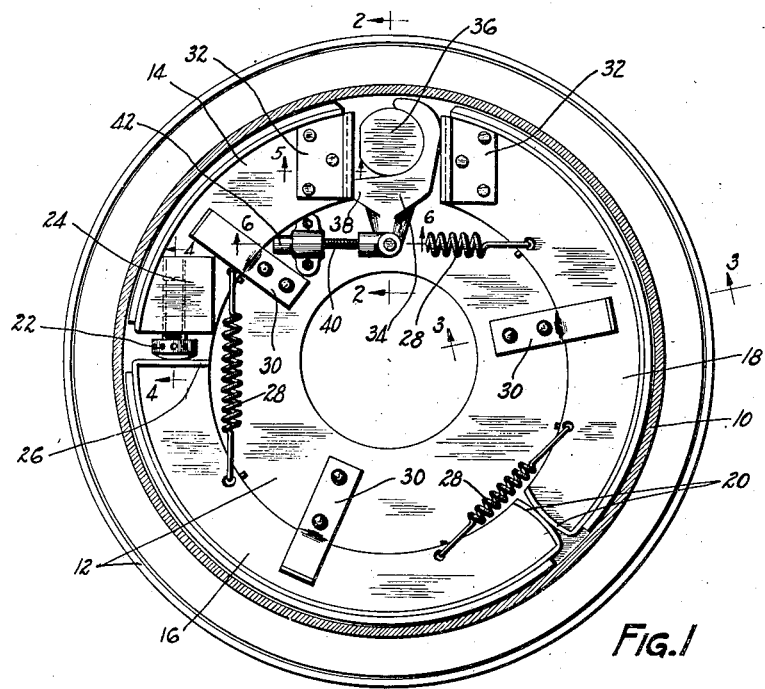
Figure 1 is a vertical section through the brake, just inside the head of the brake drum, showing the brake shoes in side elevation.

Each of the brakes shown in the drawings includes a drum 10, at the open side of which is arranged a support such as a backing plate 12, and within which is arranged the friction means of the brake.

Figure 3:
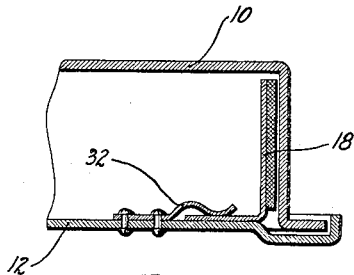
Figure 3 is a partial section on the line 3—3 of Figure 1, showing the shoe structure and one of the steady rests.
Figure 2:
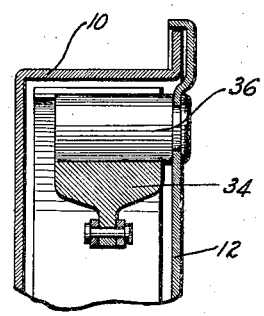
Figure 2 is a partial section on the line 2—2 of Figure 1, showing the anchorage.
Figure 4:
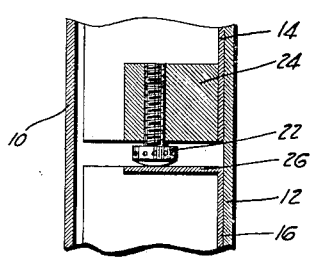
Figure 4 is a partial section on the line 4—4 of Figure 1, showing the adjustment.

In the brake illustrated in Figure 1 the friction means includes three rigid arcuate shoes 14, 16, and 18 arranged end to end and extending substantially a full circumference. These shoes are generally L-shaped in cross-section, as appears in Figure 3, and are arranged to have parts in direct thrust engagement with each other. Shoes 16 and 18 have curved integral ends 20 in rolling engagement, while shoe 14 has an adjustable thrust member 22 threaded in a part 24 welded or otherwise secured to end of the shoe and which has a rounded head in direct thrust engagement with the integral end 26 of shoe 16. Return springs 28 are tensioned between the various shoes.

In the arrangement shown I prefer to use steady rests in the form of leaf springs 30, secured at their inner ends to the backing plate and having their outer ends slidably engaging the webs of the shoes and uring them yieldingly against the backing plate.

Figure 5:
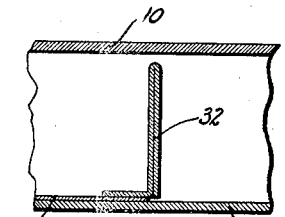
Figure 5 is a partial section on the line 5—5 of Figure 1, showing the thrust member at the cam end of one of the shoes.

Shoes 14 and 18 have permanently secured thereto suitable thrust members 32, the structure of which appears in Figure 5, and which may be made of steel stampings folded to give a generally L-shaped structure. These thrust members engage a novel applying device which preferably includes a floating cam lever 34 recessed to fit over an anchor post 36 carried by the backing plate. One side of the cam lever engages shoe 18, while a part 38 of the cam lever projects past post 36 into engagement with shoe 14. Thus when the drum is turning clockwise, the torque of all three shoes is taken by direct engagement of shoe 14 with the post 36, while when the drum is turning counter-clockwise the torque is taken through cam lever 34 by engagement of shoe 18 therewith, but is still finally taken by post 36.

According to an important feature of my invention, cam lever 34 or its equivalent is connected to a tension operating element such as a cable or wire 40, which is connected to the cam lever inside the drum and then extends horizontally through a tubular fitting 42 fixedly secured to the backing plate with its tubular portion at an acute angle to the plane of the backing plate. Outside the backing plate the flexible element extends through a flexible conduit 44 which is secured at one end to the fitting 42 and at the other end to the chassis frame, thus compensating for the swiveling of the wheel on which the brake is mounted and for movements due to deflections of the vehicle springs. The entire arrangement of conduit 44, fitting 42, and element 40 constitutes a desirable and simplified form of what is known generically in the trade as a "Bowden control".

Figure 7:
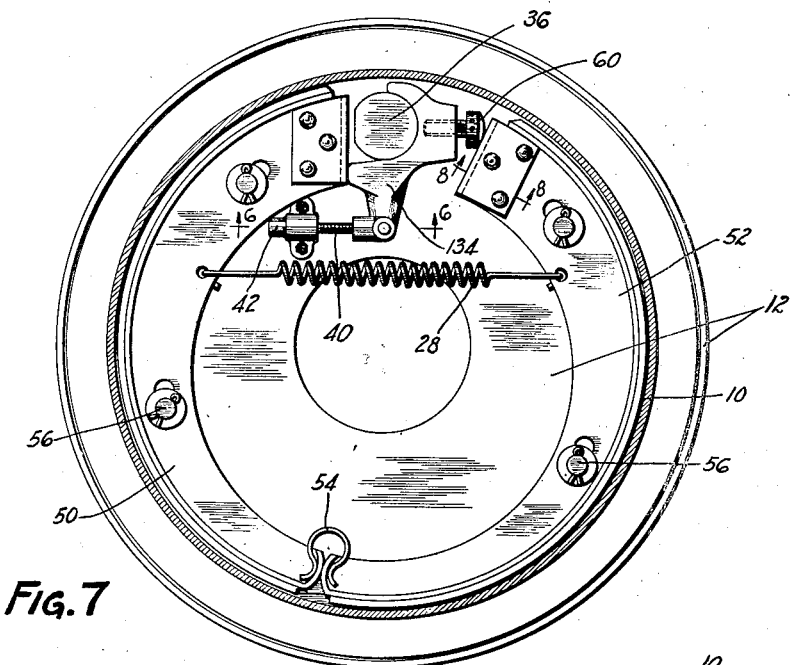
Figure 7 is a vertical section corresponding to Figure 1, showing a different brake.
Figure 6:
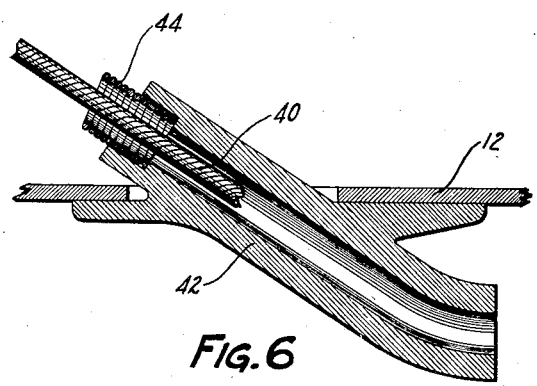
Figure 6 is a partial section on the line 6—6 of Figure 1, showing the passage of the tension operating element through the backing plate.
Figure 8:
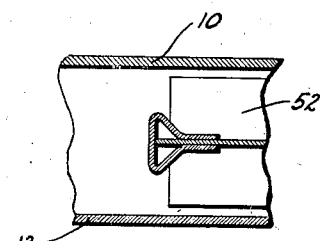
Figure 8 is a partial section, on the line 8—8 of Figure 7, showing the thrust member at the cam end of one of the shoes.

In the arrangement of Figures 7 and 8, there are two T-section shoes 50 and 52 having rounded lower ends held yieldingly in rolling engagement by means such as a U-shaped leaf spring 54. Conventional steady rests 56 are shown. Stamped thrust members 58, of the form shown in Figure 8, engage the cam lever 134, which includes the adjustment of the brake in the form of a thrust part 60 threaded therein and having a rounded head engaging shoe 52.

While two illustrative embodiments have been described in detail, it is not my intention to limit the scope of the invention to those particular embodiments, or otherwise than by the terms of the appended claims.

I claim:

1. A brake comprising three segmental shoes arranged end to end and extending substantially a full circumference, two of the shoes having parts in disconnected thrust engagement with each other, and the third having a part adjustably mounted thereon and having disconnected thrust engagement with one of the first two shoes.

2. A brake comprising three segmental shoes arranged end to end and extending substantially a full circumference, one of the shoes having a part adjustably mounted thereon and having disconnected thrust engagement with one of the other shoes.

3. A brake comprising, in combination, a drum, three segmental shoes arranged end to end and extending substantially a full circumference, two of the shoes having parts in disconnected thrust engagement with each other, and the third having a part adjustably mounted thereon and having disconnected thrust engagement with one of the first two shoes, and means for taking the braking torque of all three shoes from one shoe when the drum is turning in one direction and from a different shoe when the drum is turning in the other direction.

4. A brake comprising, in combination, a drum, three segmental shoes arranged end to end and extending substantially a full circumference, one of the shoes having a part adjustably mounted thereon and having disconnected thrust engagement with one of the other shoes, and means for taking the braking torque of all three shoes from one shoe when the drum is turning in one direction and from a different shoe when the drum is turning in the other direction.

5. A brake shoe L-shaped in cross-section having a thrust member adjustably mounted in its end.

6. A brake shoe L-shaped in cross-section having a thrust member threaded in its end.

7. A brake comprising, in combination, a drum, three segmental brake shoes arranged end to end in disconnected thrust engagement with each other, applying means acting on the central shoe through the end shoes, and torque-taking means for all three shoes on which one end shoe anchors when the drum is turning in one direction and on which the other end shoe anchors when the drum is turning in the other direction.

8. A brake comprising a plurality of friction members in disconnected thrust engagement with each other, and an applying member in disconnected thrust engagement with the friction members, the engaging part of one of said members being a part adjustably threaded therein.

9. Brake friction means comprising a plurality of shoes, one of which has a thrust member adjustably threaded therein and disconnectedly engaging the other shoe.

In testimony whereof, I have hereunto signed my name.

LUDGER E. LA BRIE.